US011975334B2

(12) United States Patent
Bai et al.

(10) Patent No.: US 11,975,334 B2
(45) Date of Patent: May 7, 2024

(54) METHOD FOR PREPARING NANOMETER MAX PHASE CERAMIC POWDER OR SLURRY HAVING LAMINATED STRUCTURE BY MEANS OF BALL MILLING AND REGULATING OXYGEN CONTENT OF POWDER (71) Applicant: Institute of Metal Research Chinese Academy of Sciences, Shenyang (CN)

(72) Inventors: Chunguang Bai, Shenyang (CN); Xi Xie, Shenyang (CN); Yuyou Cui, Shenyang (CN); Rui Yang, Shenyang (CN)

( * ) Notice: Subject to any disclaimer, the term of this patent is extended or adjusted under 35 U.S.C. 154(b) by 549 days.

(21) Appl. No.: 17/272,339

(22) PCT Filed: Aug. 19, 2019

(86) PCT No.: PCT/CN2019/101340
§ 371 (c)(1),
(2) Date: Feb. 28, 2021

(87) PCT Pub. No.: WO2020/042948
PCT Pub. Date: Mar. 5, 2020

(65) Prior Publication Data
US 2021/0322996 A1   Oct. 21, 2021

(30) Foreign Application Priority Data

Aug. 31, 2018  (CN) .......................... 201811006639.5

(51) Int. Cl.
*B02C 23/24*     (2006.01)
*B02C 17/04*     (2006.01)
(Continued)

(52) U.S. Cl.
CPC .............. *B02C 17/04* (2013.01); *B02C 17/14* (2013.01); *B02C 17/1815* (2013.01); *B02C 23/24* (2013.01); *B02C 25/00* (2013.01)

(58) Field of Classification Search
CPC ..... B02C 17/04; B02C 17/14; B02C 17/1815; B02C 17/10; B02C 25/00; B02C 23/34; B02C 23/06
See application file for complete search history.

(56) References Cited

FOREIGN PATENT DOCUMENTS

| CN | 102633505 A | * | 8/2012 | |
|---|---|---|---|---|
| CN | 107117616 A | * | 9/2017 | ............. B82Y 30/00 |

(Continued)

*Primary Examiner* — Faye Francis
(74) *Attorney, Agent, or Firm* — Novoclaims Patent Services LLC; Mei Lin Wong (57) ABSTRACT

A method for preparing nanometer MAX phase ceramic powder or slurry having a laminated structure by means of ball milling and regulating the oxygen content of the powder. Micron-sized MAX phase ceramic coarse powder is adopted as a raw material, during ball milling, a gas or a liquid-state gas having a special effect is introduced into a ball milling tank, and by means of multi-dimensional functions and regulation such as ball milling parameters and gas reaction, the nanometer laminated MAX phase ceramic powder or the slurry containing the component is obtained. The surface components and the activated state of the powder are regulated while the particle size adjustment control of the powder is realized.

19 Claims, 2 Drawing Sheets

(51) Int. Cl.
*B02C 17/14* (2006.01)
*B02C 17/18* (2006.01)
*B02C 25/00* (2006.01)

(56) References Cited

FOREIGN PATENT DOCUMENTS

| | | | | | |
|---|---|---|---|---|---|
| CN | 106824406 B | * | 10/2018 | ............. | B02C 17/10 |
| KR | 20130042270 A | * | 10/2011 | ............. | B02C 17/10 |

* cited by examiner

METHOD FOR PREPARING NANOMETER MAX PHASE CERAMIC POWDER OR SLURRY HAVING LAMINATED STRUCTURE BY MEANS OF BALL MILLING AND REGULATING OXYGEN CONTENT OF POWDER

FIELD OF INVENTION

The present invention relates to the field of ceramic materials, in particular to a method for preparing nano MAX phase ceramic powder or slurry with a laminated structure by ball milling and regulating the oxygen content of the powder.

DESCRIPTION OF RELATED ARTS

MAX phase ceramics (such as $Ti_3SiC_2$, $Ti_2AlC$, $Nb_2AlC$, and etc.) are a class of processable ceramics with many unique and excellent properties. These ceramics have covalent bonds, metal bonds and ionic bonds at the same time, so they both have the properties of ceramics and metals, such as the high melting point, oxidation resistance and corrosion resistance of ceramic materials, the conductivity, processability, damage resistance, thermal shock resistance of metals, and the radiation resistance of nano-ceramics. The above-mentioned characteristics make MAX phase ceramics being capable of applications to the fields such as high-temperature service parts, friction-resistant parts, conductive elements, corrosion-resistant parts, nuclear industry parts, and protective coatings. However, as structural ceramic materials, most MAX phase ceramics have very large crystal grains due to the high reaction synthesis temperature. Also, as a material that can be synthesized by self-propagating combustion, a large amount of heat is released during reaction synthesis. As a result, the reaction is uncontrollable, many reaction by-products are produced, and the crystal grain size control is very difficult. It is difficult to obtain nanocrystalline ceramics through reaction control. Nanocrystalline ceramics have excellent mechanical properties and some special functions due to the high proportion of grain boundaries and special structure of interface atoms. The main disadvantages of ordinary ceramics are poor toughness and low strength due to internal defects. Nano powders can significantly reduce the sintering temperature due to their high activity and large surface area. After sintering, the material has a high density and good composition uniformity. Compared with ordinary ceramics, the strength, toughness and superplasticity of ceramics are greatly improved. Therefore, the research and development of technology that can turn MAX phase ceramics into nano-ceramic powder is very important to improve the performance and application prospects of MAX phase ceramics.

Nanocomposite ceramics, due to the introduction of the second phase particles distributed in the grain boundaries, have deflection, absorption, and bridging effects on cracks, which help to improve the toughness and high-temperature strength of ceramic materials. However, the existing nanocomposite ceramics are mainly strengthened and toughened by adding external second-phase particles. The performance of the nano-composite ceramic prepared by the method is far inferior to that of the in-situ growth of the nano two-phase particle strong and toughened ceramic with phase interface matching on the nano ceramic matrix. By preparing the nano powder of MAX phase ceramics by ball milling and adjusting the surface oxygen content during ball milling, the nano MAX phase/oxide composite ceramics with fine dispersion distribution, high chemical affinity, precise and adjustable content can be grown in situ in the matrix of the nano MAX phase ceramics during sintering. This type of ceramics has excellent mechanical properties at room temperature and high temperature. Accurate and controllable content means that for different service environments of materials, the performance of materials can be optimized to meet different needs, and the advantages of materials can be effectively used to improve service adaptability.

By using hydrofluoric acid etching to remove the A-atom metal layer in the MAX phase, two-dimensional MXenes sheet materials (such as two-dimensional transition metal carbides, nitrides or carbonitrides) can be obtained. As soon as the new transition metal carbide nanosheet MXenes came out, with its excellent electrochemical performance, good water solubility, very large surface area, light weight and stability, therefore, it is expected to be widely used in many fields like graphene. For example, MXenes has good ion diffusion channels, conductivity and porous structure for use as electrode materials of lithium ion batteries. Because of its good electromagnetic coupling and loss characteristics, it is used as a light-weight and high-strength absorbing material for various electronic equipment and weapon systems. MXenes also has good biological safety, large surface area and high chemical reaction sites. The applications in catalyst carrier, water purification material and medical material have been researched and reported.

For the MXenes material of nano-sheets used as functional materials, the particle size of the precursor powder determines the scale of the accordion structure formed by the nano-sheets. For example, the MAX phase powder material as the precursor is micron-sized, and the MXenes material particles after the etching and stripping are also micron-sized, so the nanometer characteristics of the MXenes material of the nanosheet layer as a functional material is completely limited. Meanwhile, the MXenes material prepared directly by the MAX phase powder etching of the nanosheet has a unique small size effect. When the size of the sheet-layer is close to or smaller than the wavelength of the external energy source, the physical properties of optics, electricity, magnetism, acoustics, and heat have new effects. At the same time, the nanosheet MAX phase powder has large surface area, a large number of surface atoms, dense defects, high surface activity, and changes in the energy spectrum characteristics of quantum dots, which are very conducive to stripping etching or chemical modification of the surface to develop new materials. However, the MAX phase powders nanosheets used in MXenes materials generally require very low oxygen content, even the oxygen atoms with only 0.01% mass fraction of the surface oxide film in the coarse powder will have a very fatal effect on the preparation and performance of MXenes materials. Therefore, it is required to remove oxygen at the same time during the ball milling process to reduce the oxygen content to a very low level. Thus, the control of the oxygen content of the powder is also very important.

SUMMARY OF THE PRESENT INVENTION

An object of the present invention is to provide a method for preparing nano MAX phase ceramic powder or slurry with laminated structure by ball milling and regulating and controlling an oxygen content of the powder. Through a variety of different ball milling methods, the reliability and effectiveness of the technical route is verified, and MAX phase ceramic nanosheet-layered powder and slurry with different particle size and different oxygen content can be obtained. This method has simple process and can realize continuous and large-scale batch preparation.

The technical solution of the present invention is:

A method of preparing nanosheet-layered structured MAX phase ceramic powder or slurry by ball milling with oxygen content regulation and control of the powder, the method: utilizing micron MAX phase ceramic coarse powder as raw material; processing ball milling while introducing gas or liquid gas into a ball mill tank; performing multi-dimensional action and adjustment through ball milling parameters and gas reaction; and obtaining a nanosheet-layered MAX phase ceramic powder or a slurry containing the nanosheet-layered MAX phase ceramic powder, realizing a regulation and control of a particle size of the powder while realizing a regulation of a composition and active state of a surface of the powder.

For the method of preparing nanosheet-layered structured MAX phase ceramic powder or slurry by ball milling with oxygen content regulation and control of the powder, a ball milling device is used to ball mill the MAX phase ceramic coarse powder with a size of 1~5000 microns, and the gas or liquid gas with precise chemical composition ratio is continuously introduced into the ball mill tank while processing ball milling.

For the method of preparing nanosheet-layered structured MAX phase ceramic powder or slurry by ball milling with oxygen content regulation and control of the powder, depending on a target particle size and oxygen content requirements, a temperature controlled ball milling device is use not is not used during the process of ball milling; the ball mill equipment is ordinary planetary ball mill, high-energy ball mill, drum ball mill, stirring ball mill or vibration ball mill; the method of ball milling is wet ball milling or dry ball milling; the nanosheet-layered powder obtained by different equipment, preparing methods and parameters has an adjustable particle size between 20-400 nanometers, and an adjustable oxygen content of 0.0001%-20% by mass fraction.

For the method of preparing nanosheet-layered structured MAX phase ceramic powder or slurry by ball milling with oxygen content regulation and control of the powder, the control of gas content adopts a mixing ratio of oxygen and inert gas, or a mixing ration of hydrogen and inert gas, the ratio of oxygen or hydrogen to inert gas ranges from greater than 0 to 1 in terms of volume fraction.

For the method of preparing nanosheet-layered structured MAX phase ceramic powder or slurry by ball milling with oxygen content regulation and control of the powder, a temperature control is realized as follows: for drum ball mill, stirring ball mill or vibration ball mill, use a jacket that can pass liquid medium outside the ball mill tank, or directly pass temperature control medium into the tank; for ordinary planetary ball mills or high-energy ball mills, pass a liquid medium through the outside of the entire ball mill tank for temperature control; for ultra-low temperature, the cooling medium uses low-temperature liquid gas coolant: liquid argon, liquid nitrogen, liquid oxygen and polymer material sheath; for other temperature control, the control medium uses oil, water, alcohol, ketone, benzene and other liquids, the temperature control media has an adjustable temperature range of −200~300° C.

For the method of preparing nanosheet-layered structured MAX phase ceramic powder or slurry by ball milling with oxygen content regulation and control of the powder, for wet ball milling, process ball milling after mixing MAX phase ceramic powder, ball milling medium, and ball milling beads, for dry ball milling, process ball milling after mixing MAX phase ceramic powder, a surface dispersant, and ball milling beads, or after mixing MAX phase ceramic powder, and ball milling beads, if purity control of the powder is required, the ball milling beads and ball milling tank are stainless steel acid-soluble metal balls and ball milling tank, alumina or agate alkali-soluble ceramic balls and ball milling tank, or polymer ball milling balls and ball milling tank, if purity and impurity control is not required, the ball milling beads and ball milling tank of any materials are used, the ball milling medium is a volatile liquid solvent including oil, water, alcohol, ketone and benzene, and the surface dispersant is a water-soluble and organic solvent-soluble dispersant.

In the method of preparing nanosheet-layered structured MAX phase ceramic powder or slurry by ball milling with oxygen content regulation and control of the powder, for the ball milling parameters, the ball milling beads and MAX phase ceramic powder are mixed at a mass ratio of 1:1 to 100:1; for wet ball milling, the amount of ball milling media added is between 10% and 500% of the total mass of balls material; for dry ball milling, the amount of surface dispersant added is between 0.01% and 10% of the total mass of the MAX phase ceramic powder; for roller ball mill, stirring ball mill, and ordinary planetary ball mill, the ball milling speed is between 20 and 2000 rpm, and the ball milling time is 1 to 72 hours; for high-energy ball mill, the ball milling speed is between 200 and 50,000 rpm, and the ball milling time is 0.5 to 48 hours; for vibrating ball mill, the vibration frequency is between 5 and 5000 Hz, the amplitude is between 1 and 50 mm, and the ball milling time is 2 to 180 hours.

In the method of preparing nanosheet-layered structured MAX phase ceramic powder or slurry by ball milling with oxygen content regulation and control of the powder, the processing of ball milling products is determined by the status of use of the required materials:

(1) if it is needed to obtain the material in a slurry state, the slurry and ball mill beads obtained by wet ball milling can be screened or filtered to obtain the slurry, or for dry ball milling, after the powder particle size reaches the target value, add the ball milling medium required for wet ball milling, and then ball mill for 5~1000 minutes to obtain a slurry with good dispersibility, then the obtained slurry and ball milling beads are sieved or suction filtered to obtain the slurry;

(2) if it is needed to obtain the powder with an oxygen content of less than 5% by mass, the slurry obtained by wet ball milling is dried or evaporated under reduced pressure under the protection of vacuum and argon, or the powder obtained by dry ball milling is sieved in a vacuum glove box and sealed for storage;

(3) for the powder with an oxygen content higher than 5% by mass, the slurry drying and powder screening processes is completed in the atmosphere.

In the method of preparing nanosheet-layered structured MAX phase ceramic powder or slurry by ball milling with oxygen content regulation and control of the powder, if it is required to control impurity purity of the powder, the powder is pickled if acid-soluble metal beads and ball milling tank are used, or alkali cooking is used to remove ball mill impurities if alkali-soluble ceramic beads and ball milling tank are used.

The design idea of the present invention is:

According to the present invention, through the method of ball milling, the MAX phase sheet layers directly produce fatigue microcracks, or the interface between the sheet layers is separated. At the same time, the gas is continuously introduced during the ball milling process. The effective components in the gas will diffuse into the fresh surface through fatigue cracks and stacking faults between the sheet layers during the ball milling process and weakly react with the highly active surface to accelerate surface cleavage and cracking. At the same time, more surface cleavage and cracking further promote the diffusion of the reaction gas, and finally the MAX phase ceramic particles are completely decomposed and form sheet layers, and sheet-layered structure with a nano-shape and a special surface state is obtained. The degree of interface reaction of the process, the final size and oxygen content of the nanosheet layers are multi-dimensionally controlled by factors such as ball milling parameters, ball milling environment temperature, gas composition and flow rate. The present invention and technical solution solve the problems of preparation, surface activity and function control of MAX phase ceramic nanosheet layers.

The advantageous and beneficial effects of the present invention are as follows:

1. The technical method of the present invention can be realized by almost all ball milling methods such as roller ball milling, stirring ball milling, vibrating ball milling, ordinary planetary ball milling or high-energy ball milling. It has wide technical adaptability, simple and effective method, and is suitable for mass continuous production.

2. The technical route of ball milling of the present invention realizes the single effective or cross application of dry ball milling and wet ball milling, solves the problem of large differences in different technical routes, and enhances the portability of technology and the diversity of products.

3. The technology of the present invention achieves a variety of product forms, and depending on the final target product, various forms of powder and slurry can be obtained.

4. The technical method of the present invention is effective for almost all MAX-phase ceramics. Considering that there are more than one hundred kinds of MAX-phase ceramics, the effective coverage of its preparation methods is wide, and the design space for different raw materials and product properties is large.

5. The purity control of the product of the present invention can realize the effectiveness and versatility of purity control and meet different material requirements through control of multiple adjustments such as the appropriate ball milling method, ball mill parameters, ball mill material, gas ratio, post-processing steps, etc.

6. The final product of the present invention has an adjustable particle size of nanosheet-layered powder between 20 and 400 nanometers, and an adjustable oxygen content between 0.0001% and 20% by mass fraction.

DETAILED DESCRIPTION OF THE PREFERRED EMBODIMENT OF THE PRESENT INVENTION

In the implementation process of the embodiment, the present invention uses micron-level MAX phase ceramic coarse powder as raw material. During ball milling, a gas or liquid gas with special effects is introduced into the ball mill tank (special effects refer to: accelerating the cleavage and cracking of the ceramic sheet, and weakly reacting with the cracked sheet interface to increase or decrease the oxygen content on the surface of the sheet) Through multi-dimensional effects and adjustments such as ball milling parameters and gas reaction, a nanosheet layered MAX phase ceramic powder or a slurry containing its components is obtained, which realizes the control of the particle size of the powder and the control of the powder surface composition and active state at the same time. The finally obtained powder or slurry can be used as a precursor to meet the needs of high-end MXenes material peeling and functionalization, or as a nanometer raw material powder for MAX phase ceramics, the method of sintering to prepare in-situ nano MAX phase/oxide composite ceramics with adjustable oxide content has the specific process as follows:

1. Process ball milling of MAX phase ceramic coarse powder with a size of 1-5000 microns (preferably 20-80 microns) by using a ball milling device. During ball milling, continuously introduce gas or liquid gas with precisely proportioned chemical composition into a ball mill tank of the ball milling device. Depending on the target particle size and oxygen content requirements, ball milling equipment with or without temperature-controlled can be used for ball milling. The ball milling equipment can be any ball milling equipment such as ordinary planetary ball mills, high-energy ball mills, roller ball mills, stirring ball mills, vibrating ball mills, and etc. The ball milling method can be wet ball milling and dry ball milling. The nanosheet powder obtained by different equipment, preparation methods and parameters have a particle size adjustable between 20-400 nanometers (preferably 100-200 nanometers), and a mass fraction of oxygen content adjustable between 0.0001%-20% (preferably 0.02%-10%).

2. The control of gas content uses the mixing ratio of oxygen, inert gas or hydrogen, and inert gas. The volume fraction calculation of a range of oxygen (or hydrogen):inert gas ratio is 0-1 (preferably 0.1-0.3).

3. For wet ball milling, process ball milling after mixing MAX phase ceramic powder, ball milling medium, and ball milling beads. For dry ball milling, process ball milling after mixing MAX phase ceramic powder, a surface dispersant, and ball milling beads, or after mixing MAX phase ceramic powder, and ball milling beads. When it is necessary to control the purity of the powder, the ball milling beads and ball milling tank can be beads and ball milling tank of acid-soluble metal such as stainless steel, beads and ball milling tank of alkali-soluble ceramic such as alumina and agate, and beads and ball milling tank of polymer. When it is not necessary to control the purity and impurity, the ball milling beads and ball milling tank of any materials can be used. The ball milling medium can be a volatile liquid solvent such as oil, water, alcohol, ketone, benzene, etc., and the surface dispersant can be a water-soluble and organic solvent-soluble dispersant.

4. The temperature control is realized by: using a jacket that can pass liquid medium outside the ball mill tank, or directly pass temperature control medium into the tank for drum ball mill, stirring ball mill or vibration ball mill; and pass a liquid medium through the outside of the entire ball mill tank for temperature control for ordinary planetary ball mills or high-energy ball mills. For ultra-low temperature cooling medium, low-temperature liquid gas coolant is adopted: liquid argon, liquid nitrogen, liquid oxygen and polymer material sheath. The temperature range of ultra-low temperature cooling medium can be adjusted between −200~180° C. Other temperature control media can be oil, water, alcohol, ketone, benzene and other liquids. The temperature control media can adjust the temperature range of −50~300° C. (preferably −10~100° C.).

5. In the ball milling parameters, the ball milling beads and MAX phase ceramic powder are mixed at a mass ratio of 1:1 to 100:1. For wet ball milling, the amount of ball milling medium added is between 10% and 500% of the total mass of the ball material. For dry ball milling, the amount of surface dispersant added is between 0.01% and 10% of the total mass of MAX phase ceramic powder. For roller ball mills, stirring ball mills, and ordinary planetary ball mills, the ball milling speed is between 20~2000 rpm (revolution per minute), and the ball milling time is 1~72 hours. For high-energy ball mills, the ball milling speed is between 200~50,000 rpm, and the ball milling time is 0.5~48 hours. For the vibrating ball mill, the vibration frequency is between 5~5000 Hz, the amplitude is between 1~50 mm, and the ball milling time is 2~180 hours.

6. The processing of ball milling products is determined by the status of use of the required materials. If it is needed to obtain the material in a slurry state, the slurry and ball mill beads obtained by wet ball milling can be screened or filtered to obtain the slurry, or for dry ball milling, after the powder particle size reaches the target value, add the ball milling medium required for wet ball milling, and then ball mill for 5~1000 minutes to obtain a slurry with good dispersibility, then the obtained slurry and ball milling beads are sieved or suction filtered to obtain the slurry. If it is needed to obtain the powder with an oxygen content of less than 5% by mass, the slurry obtained by wet ball milling is dried or evaporated under reduced pressure under the protection of vacuum and argon, or the powder obtained by dry ball milling is sieved in a vacuum glove box and sealed for storage. For the powder with an oxygen content higher than 5% by mass, the slurry drying and powder screening processes can be completed in the atmosphere. If it is required to control impurity purity of the powder, the powder is pickled if acid-soluble metal beads and ball milling tank are used, or alkali cooking is used to remove ball mill impurities if alkali-soluble ceramic beads and ball milling tank are used.

Since the present invention covers a wide range of technical methods and routes, and a wide range of adjustment and control of the final product, in order to further understand the objects, solutions and advantages of this discovery of the present invention, the present invention is further described clearly and completely in combination with specific embodiments. Also, it is noted that the embodiments described below are only parts of the entire work and exemplary embodiments, and not all of the possible embodiments. Any use of technical methods within the scope of the claims of the present invention shall fall within the protection scope of the present invention.

Embodiment 1

According to this embodiment, a method of preparing nano-laminated structured MAX phase ceramic powder or slurry by ball milling with oxygen content regulation and control of the powder is as follows:

(1) Weigh 50 grams of MAX phase ceramic powder with a product name of $Ti_3AlC_2$, the ceramic powder, as measured by a laser particle size analyzer, has a median diameter of 100 microns, and weigh 0.2 grams of dispersant of sodium polymethacrylate.

(2) Put $Ti_3AlC_2$ ceramic powder and dispersant in a stainless steel ball mill tank that can pass gas with a volume of 500 mL, and put in 400 grams of stainless steel balls.

(3) Install the ball mill tank on a planetary ball mill with continuous gas flow. Start to introduce a mixture gas of hydrogen and argon at a volume ratio of 1:5. The gas flow rate is 5 liters per hour. Keep the gas flow until the ball milling temperature is decreased to a preset value.

(4) Set the environment temperature of the ball mill to room temperature, that is, other temperature control media is not introduced. Start the ball mill for carrying out ball milling at a rotational speed of 600 rpm for 12 hours.

(5) After the ball milling is finished, start the ball mill chamber cooling system, wait for the ball mill tank temperature to drop to 0° C., close the gas inlet, seal the ball mill tank, and turn off the ball mill and the ball mill cooling system.

(6) Remove the ball mill tank from the ball mill, and put it and the powder screen and powder packaging machine into the vacuum glove box. Start the vacuum system of the vacuum glove box, turn off the vacuum system when the vacuum degree drops to $10^{-3}$ Pa, and then introduce argon gas into the glove box. The ball milling beads are sorted out in the glove box, the powder is sieved, and the powder is vacuum packaged and stored.

The powder obtained by this method is chemically analyzed, and the oxygen content is 0.0002% by mass, which is far lower than the 0.04% oxygen content of the raw material powder. The powder particle size is measured by the laser particle size analyzer and has a median diameter of 100 nanometers. The powder can be used as a precursor to meet the needs of high-end MXenes material stripping and etching.

Embodiment 2

According to this embodiment, a method of preparing nano-laminated structured MAX phase ceramic powder or slurry by ball milling with oxygen content regulation and control of the powder is as follows:

(1) Weigh 500 grams of MAX phase ceramic powder with a product name of $Nb_3AlC_2$, the ceramic powder, as measured by a laser particle size analyzer, has a median diameter of 50 microns, and use liquid argon as the medium for ball milling.

(2) Put $Nb_3AlC_2$ ceramic powder in a polyurethane ball mill tank that can pass gas or liquid with a volume of 10 L, and put in 8 kg of polyurethane coated iron balls.

(3) Install the ball mill tank on a roller ball mill. Start to introduce liquid argon and liquid hydrogen into the ball mill tank. The flow rate of liquid argon is 2 liters per hour, and the flow rate of liquid hydrogen is 0.5 liters per hour.

(4) Maintain the supply of liquid gas until the temperature in the ball mill tank remains constant at −150° C. Start the ball mill and set the drum speed to 100 rpm for carrying out ball milling for 72 hours.

(5) After the ball milling is finished, close the liquid gas supply, seal the ball mill tank, turn off the ball mill and remove the ball mill tank from the ball mill.

(6) Remove the ball mill tank from the ball mill, and put it and the powder screen and powder packaging machine into the vacuum glove box. Start the vacuum system of the vacuum glove box, turn off the vacuum system when the vacuum degree drops to $10^{-3}$ Pa, and then introduce argon gas into the glove box. The ball milling beads are sorted out in the glove box, the powder is sieved, and the powder is vacuum packaged and stored.

Because the ball milling process is completed at extremely low temperatures, and liquid gas is introduced for protection at the same time, the oxidation process of the material is effectively avoided. According to chemical analysis, the oxygen content of the powder after ball milling is 0.01% by mass, slightly lower than the 0.02% oxygen content of the raw powder. At the same time, under the action of extreme low temperature and liquid hydrogen, the brittleness of the material is obviously increased. After the ball milling is completed, the nanosheet-layered $Nb_3AlC_2$ has a particle median diameter of 50 nanometers. The powder can be used as a precursor to meet the needs of high-end MXenes material stripping and etching.

Embodiment 3

Figure 1:
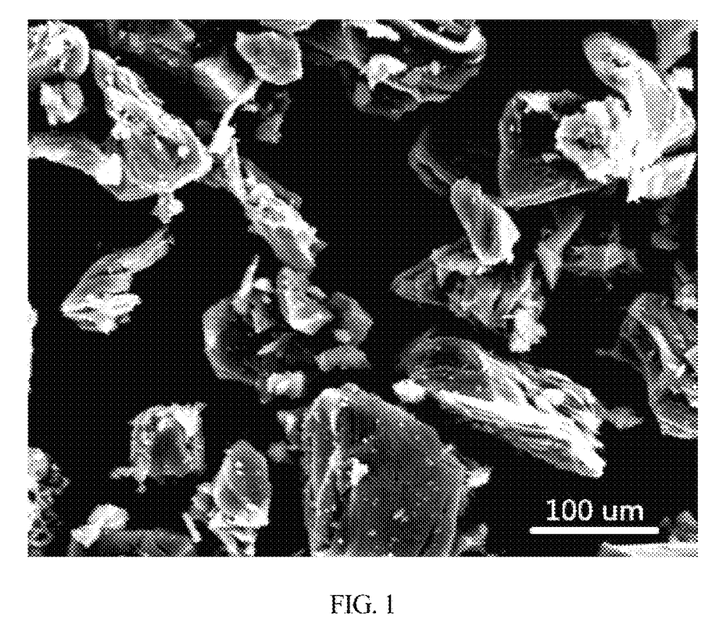
FIG. 1 is a scanning electron microscope photo of MAX phase ceramic powder.
Figure 2:
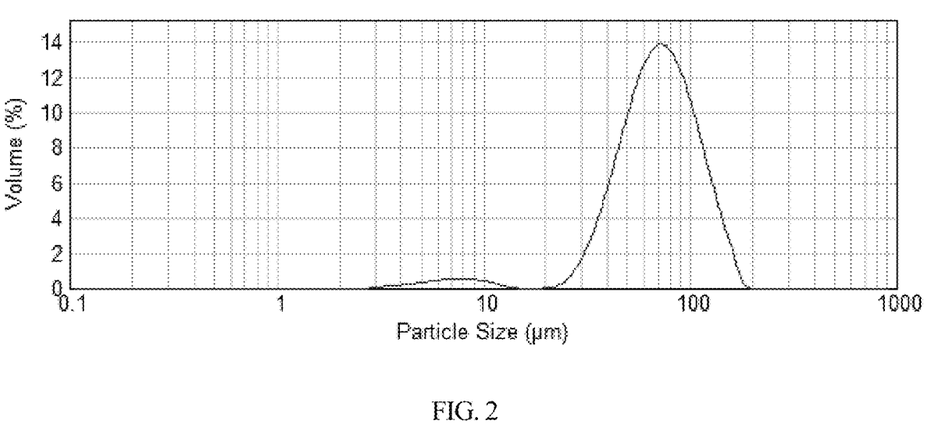
FIG. 2 is a measurement data curve of particle size using ceramic powder laser particle size analyzer. In the figure, the abscissa Particle Size represents the particle size ($\mu$m), and the ordinate Volume represents the volume percentage (%).

According to this embodiment, a method of preparing nano-laminated structured MAX phase ceramic powder or slurry by ball milling with oxygen content regulation and control of the powder is as follows:

(1) Weigh 500 grams of MAX phase ceramic powder with a product name of $Ti_2AlC$, its powder scanning electron microscope photo is shown in FIG. 1. The ceramic powder laser particle size analyzer measures a particle diameter of 80 microns (see FIG. 2 for the results of the particle size measurement). Measure 1000 ml of liquid toluene.

(2) Put $Ti_2AlC$ ceramic powder and deionized water in a vacuum agate mill mixing tank that can pass gas with a volume of 5 L, and put in 4 kg of agate balls.

(3) Install the ball mill tank on a stirring ball mill with temperature control medium jacket for temperature control. Start to introduce a mixture gas of oxygen and nitrogen at a volume ratio of 1:4. The gas flow rate is 10 liters per hour. Keep the gas flow until the end of ball milling.

(4) Pass the temperature control medium glycerin into the temperature control medium jacket and start the heating system. After the ball mill tank temperature is constant at 150° C., start the ball mill for carrying out ball milling at a rotational speed of 1000 rpm for 24 hours.

(5) After the ball milling is finished, start the ball mill chamber cooling system, wait for the ball mill tank temperature to drop to 0° C., close the gas inlet, seal the ball mill tank, and turn off the ball mill and the ball mill cooling system.

(6) Remove the ball mill tank from the ball mill. After sorting out the ball milling beads in the indoor environment, the obtained slurry is suction filtered in the suction filter device to obtain the slurry which is available for use.

(7) If it is needed to obtain powder, the slurry can be dried directly. That is, an oven can be used for drying or a centrifugal atomization dryer can be used for drying. Then the powder can then be obtained.

Figure 3:
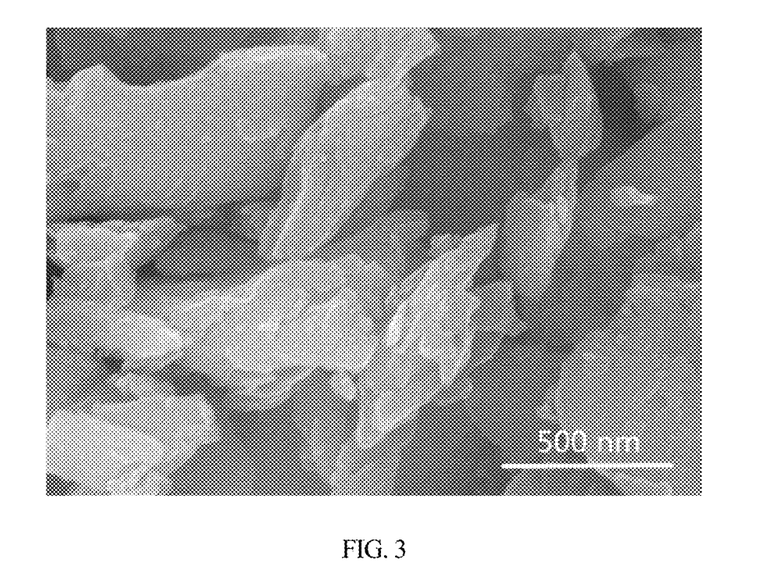
FIG. 3 is a scanning electron microscope photo of high oxygen content nanosheet-layered powder.
Figure 4:
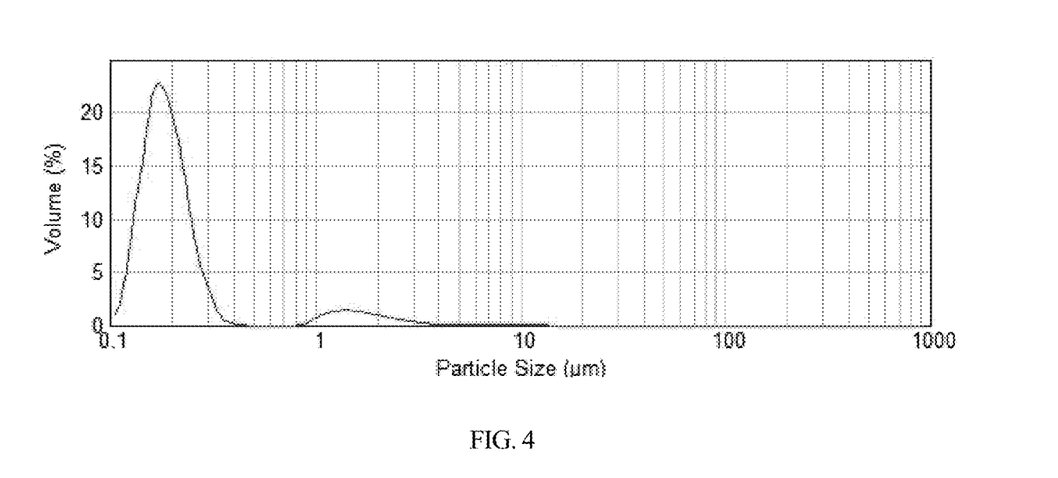
FIG. 4 is a measurement data curve of particle or powder particle size in slurry using ceramic powder laser particle size analyzer. In the figure, the abscissa Particle Size represents the particle size ($\mu$m), and the ordinate Volume represents the volume percentage (%).

This method can be used to prepare slurry for forming ceramics directly and can also be used to prepare nano-sheet layered powder with high oxygen content (see FIG. 3 for the scanning electron microscope image). After chemical analysis of the obtained powder, the oxygen content is 10% by mass fraction, which is much higher than the 0.03% oxygen content in the powder of the raw material. The particle or powder in the slurry measured by the laser particle size analyzer has a median diameter of 180 nm (the results of the particle size measurement data are shown in FIG. 4). The powder can be used as a precursor to meet the needs of high-end MXenes material stripping and etching. The powder and particles can absorb oxygen on the surface and absorb high level of oxygen. However, the crystal structure and material nature are nanosheet layered powders that have not been altered. During the sintering process of the powder, in-situ growth and precipitation of nano-alumina particles on nano $Ti_2AlC$ ceramic sheet layers is realized, and the nano $Ti_2AlC/Al_2O_3$ composite ceramic obtained after densification has excellent performance far exceeding that of ordinary ceramics.

What is claimed is:

1. A method of preparing nanosheet-layered structured MAX phase ceramic powder or slurry, comprising the steps of: (a) utilizing micron MAX phase ceramic coarse powder as raw material; (b) providing a ball milling device and processing ball milling while introducing gas or liquid gas into a ball milling tank of the ball milling device; (c) setting ball milling parameters and performing gas reaction; and obtaining a final product of a nanosheet-layered MAX phase ceramic powder or a slurry containing the nanosheet-layered MAX phase ceramic powder having an oxygen content controllable through steps (a)-(c), wherein the ball milling parameters refer to one or more of: a ball milling time, a ball milling temperature, ball milling medium, ball milling environment, ball material mass ratio, a ball milling speed or a vibration frequency and amplitude, thereby realizing a regulation and control of a particle size of the ceramic powder while realizing a regulation of a composition and an active state of a surface of the powder.

2. The method of preparing nanosheet-layered structured MAX phase ceramic powder or slurry according to claim 1, wherein, the MAX phase ceramic coarse powder has a size of 1-5000 microns, and the gas or the liquid gas has a precise chemical composition ratio, wherein the gas or the liquid gas is continuously introduced into the ball milling tank while processing ball milling.

3. The method of preparing nanosheet-layered structured MAX phase ceramic powder or slurry according to claim 1, wherein the ball milling device is a planetary ball mill, a high-energy ball mill, a drum ball mill, a stirring ball mill or a vibration ball mill; the process of ball milling is wet ball milling or dry ball milling; the nanosheet-layered MAX phase ceramic powder obtained has an adjustable particle size between 20-400 nanometers, and an adjustable oxygen content of 0.0001%-20% by mass fraction.

4. The method of preparing nanosheet-layered structured MAX phase ceramic powder or slurry according to claim 3, wherein the gas or the liquid gas has a content which adopts a mixing ratio of oxygen and inert gas, or a mixing ratio of hydrogen and inert gas, and the ratio of oxygen or hydrogen to inert gas ranges from greater than 0 to 1 in terms of volume fraction.

5. The method of preparing nanosheet-layered structured MAX phase ceramic powder or slurry according to claim 3, wherein a temperature control for the ball milling device is carried out and is realized as follows:

for the drum ball mill, the stirring ball mill or the vibration ball mill, a jacket that can pass a liquid medium outside the ball milling tank is used, or a a liquid medium for temperature control is directly introduced into the ball milling tank;

for the planetary ball mill or the high-energy ball mill, a liquid medium is provided through an outside of the entire ball milling tank;

wherein for providing an ultra-low temperature to the ball milling device, the liquid medium is a cooling medium selected from the group consisting of liquid argon, liquid nitrogen, liquid oxygen and polymer material sheath;

wherein for providing non-ultra low temperature to the ball milling device, the liquid medium is selected from the group consisting of oil, water, alcohol, ketone, and benzene;

the liquid medium for temperature control has an adjustable temperature range of −200~300° C.

6. The method of preparing nanosheet-layered structured MAX phase ceramic powder or slurry according to claim 4, wherein the process of ball milling is wet ball milling, and before step (b), further comprises the step of: mixing MAX phase ceramic coarse powder, a ball milling medium, and ball milling beads, wherein the ball milling medium is a volatile liquid solvent including oil, water, alcohol, ketone and benzene; and an amount of the ball milling medium added is between 10% and 500% of a total mass of balls material.

7. The method of preparing nanosheet-layered structured MAX phase ceramic powder or slurry according to claim 6, wherein the ball milling device is the drum ball mill, the stirring ball mill, or the planetary ball mill, wherein the ball material mass ratio is the ball milling beads and the MAX phase ceramic coarse powder are mixed at a mass ratio of 1:1 to 100:1; a ball milling speed between 20 and 2000 rpm, and a ball milling time 1 to 72 hours.

8. The method of preparing nanosheet-layered structured MAX phase ceramic powder or slurry according to claim 6, wherein if the final product is the slurry containing the nanosheet-layered MAX phase ceramic powder, a processing method is provided after the ball milling process, the processing method comprises the steps of: screening or filtering a slurry and the ball mill beads from the ball milling device to obtain the final product;

if the final product is the nanosheet-layered MAX phase ceramic powder having an oxygen content of less than 5% by mass, a processing method is provided after the ball milling process, the processing method comprises the steps of: drying or evaporating a slurry under reduced pressure and under a protection of vacuum and argon;

if the final product is the nanosheet-layered MAX phase ceramic powder having an oxygen content of greater than 5% by mass, a processing method is provided after the ball milling process, the processing method comprises the steps of: drying a slurry to obtain a dried powder and screening the dried powder under atmospheric condition.

9. The method of preparing nanosheet-layered structured MAX phase ceramic powder or slurry according to claim 6, wherein the ball milling beads and the ball milling tank are: stainless steel acid-soluble metal balls and ball milling tank, alumina or agate alkali-soluble ceramic balls and ball milling tank, or polymer ball milling balls and ball milling tank.

10. The method of preparing nanosheet-layered structured MAX phase ceramic powder or slurry according to claim 9, further comprising a step of: controlling impurity and purity of the final product, wherein if acid-soluble metal beads and ball milling tank are used, the powder is pickled; if alkali-soluble ceramic beads and ball milling tank are used, alkali cooking is used to remove ball mill impurities.

11. The method of preparing nanosheet-layered structured MAX phase ceramic powder or slurry according to claim 6, wherein the ball milling device is the high-energy ball mill, wherein the ball milling parameters are: a mixture of the ball milling beads and the MAX phase ceramic coarse powder at a mass ratio of 1:1 to 100:1, a ball milling speed between 200 and 50,000 rpm, and a ball milling time 0.5 to 48 hours.

12. The method of preparing nanosheet-layered structured MAX phase ceramic powder or slurry according to claim 6, wherein the ball milling device is the vibration ball mill, wherein the ball milling parameters are: a mixture of the ball milling beads and the MAX phase ceramic coarse powder at a mass ratio of 1:1 to 100:1; a vibration frequency between 5 and 5000 Hz, an amplitude between 1 and 50 mm, and a ball milling time 2 to 180 hours.

13. The method of preparing nanosheet-layered structured MAX phase ceramic powder or slurry according to claim 4, wherein the process of ball milling is dry ball milling, and before step (b), further comprises the step of:
(i) mixing MAX phase coarse ceramic powder, a surface dispersant, and ball milling beads, or
(i') mixing MAX phase coarse ceramic powder, and ball milling beads,
wherein the surface dispersant is a water-soluble and organic solvent-soluble dispersant, and an amount of surface dispersant added is between 0.01% and 10% of the total mass of the MAX phase ceramic powder.

14. The method of preparing nanosheet-layered structured MAX phase ceramic powder or slurry according to claim 11, wherein the ball milling beads and the ball milling tank are: stainless steel acid-soluble metal balls and ball milling tank, alumina or agate alkali-soluble ceramic balls and ball milling tank, or polymer ball milling balls and ball milling tank.

15. The method of preparing nanosheet-layered structured MAX phase ceramic powder or slurry according to claim 14, further comprising a step of: controlling impurity and purity of the final product, wherein if acid-soluble metal beads and ball milling tank are used, the powder is pickled; if alkali-soluble ceramic beads and ball milling tank are used, alkali cooking is used to remove ball mill impurities.

16. The method of preparing nanosheet-layered structured MAX phase ceramic powder or slurry according to claim 11, wherein the ball milling device is the drum ball mill, the stirring ball mill, or the planetary ball mill, wherein the ball milling parameters are: a mixture of the ball milling beads and the MAX phase ceramic coarse powder at a mass ratio of 1:1 to 100:1; a ball milling speed between 20 and 2000 rpm, and a ball milling time 1 to 72 hours.

17. The method of preparing nanosheet-layered structured MAX phase ceramic powder or slurry according to claim 13; wherein the ball milling device is the high-energy ball mill, wherein the ball milling parameters are: a mixture of the ball milling beads and the MAX phase ceramic coarse powder at a mass ratio of 1:1 to 100:1 a ball milling speed between 200 and 50,000 rpm, and a ball milling time 0.5 to 48 hours.

18. The method of preparing nanosheet-layered structured MAX phase ceramic powder or slurry according to claim 13, wherein the ball milling device is the vibration ball mill, wherein the ball milling parameters are: a mixture of the ball milling beads and the MAX phase ceramic coarse powder at a mass ratio of 1:1 to 100:1; a vibration frequency between 5 and 5000 Hz, an amplitude between 1 and 50 mm, and a ball milling time 2 to 180 hours.

19. The method of preparing nanosheet-layered structured MAX phase ceramic powder or slurry according to claim 13, wherein if the final product is the slurry containing the nanosheet-layered MAX phase ceramic powder, a processing method is provided after the ball milling process, the processing method comprises the steps of: adding a ball milling medium to carry out wet ball milling after a powder particle size reaches a preset value; then ball milling for 5~1000 minutes to obtain a slurry with good dispersibility; and sieving or suction filtering to obtain the final product;

if the final product is the nanosheet-layered MAX phase ceramic powder having an oxygen content of less than 5% by mass, a processing method is provided after the ball milling process, the processing method comprises the steps of: sieving the powder obtained after dry ball milling in a vacuum glove box and sealing for storage;

if the final product is the nanosheet-layered MAX phase ceramic powder having an oxygen content of greater than 5% by mass, a processing method is provided after the ball milling process, the processing method comprises the steps of: screening the powder under an atmospheric condition.

* * * * *